US009235293B2

(12) United States Patent
Chang et al.

(10) Patent No.: US 9,235,293 B2
(45) Date of Patent: Jan. 12, 2016

(54) OPTICAL TOUCH DEVICE AND TOUCH SENSING METHOD

(75) Inventors: Hsun-Hao Chang, New Taipei (TW); Yu-Yen Chen, New Taipei (TW); Sheng-Hsien Hsieh, New Taipei (TW); Shou-Te Wei, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 218 days.

(21) Appl. No.: 13/607,818

(22) Filed: Sep. 10, 2012

(65) Prior Publication Data

US 2013/0278563 A1 Oct. 24, 2013

(30) Foreign Application Priority Data

Apr. 19, 2012 (TW) ............................... 101113919 A

(51) Int. Cl.
G06F 3/042 (2006.01)
G06F 3/041 (2006.01)
(52) U.S. Cl.
CPC ............ G06F 3/0428 (2013.01); G06F 3/0416 (2013.01); *G06F 2203/04104* (2013.01)
(58) Field of Classification Search
CPC ..... G06F 3/042; G06F 3/0421; G06F 3/0423; G06F 3/0428; G06F 2203/04109
USPC .......................................................... 345/175
See application file for complete search history.

(56) References Cited

U.S. PATENT DOCUMENTS

| 2008/0143690 | A1* | 6/2008 | Jang et al. ...................... 345/175 |
| 2010/0134445 | A1* | 6/2010 | Cho et al. ....................... 345/175 |
| 2011/0193777 | A1* | 8/2011 | Zhou et al. ..................... 345/157 |
| 2011/0205189 | A1* | 8/2011 | Newton ......................... 345/175 |
| 2012/0299879 | A1 | 11/2012 | Kim |

FOREIGN PATENT DOCUMENTS

| CN | 101788872 | 7/2010 |
| CN | 201673485 | 12/2010 |
| CN | 102057348 A | 5/2011 |

(Continued)

OTHER PUBLICATIONS

Office action mailed on Jul. 17, 2014 for the Taiwan application No. 101113919, filing date: Apr. 19, 2012, p. 1 line 1-14, p. 2-6 and p. 7 line 1-7.

(Continued)

*Primary Examiner* — Ariel Balaoing
*Assistant Examiner* — Stefan M Oehrlein
(74) *Attorney, Agent, or Firm* — Winston Hsu; Scott Margo

(57) ABSTRACT

An optical touch device includes an indication plane, two image sensing units and a processing unit. The two image sensing units are disposed at two corners of the indication plane diagonal to each other, respectively, and the two corners define a diagonal line connected therebetween. The processing unit is electrically connected to the two image sensing units. When two touch points are performed on the indication plane, the processing unit determines whether the two touch points are located at opposite sides of the diagonal line, respectively, according to images sensed by the two image sensing units. Once the two touch points are located at opposite sides of the diagonal line, respectively, the processing unit calculates and outputs coordinates of the two touch points immediately according to the images sensed by the two image sensing units.

2 Claims, 8 Drawing Sheets

(56) References Cited

FOREIGN PATENT DOCUMENTS

| | | |
|---|---|---|
| CN | 201853210 | 6/2011 |
| TW | 201104533 | 2/2011 |
| TW | 201128479 | 8/2011 |
| WO | 2011071305 A2 | 6/2011 |
| WO | WO 2011071305 A2 * | 6/2011 |

OTHER PUBLICATIONS

Office action mailed on Aug. 19, 2015 for the China application No. 201210136111.6, p. 3 and p. 4 line 1-30.

* cited by examiner

OPTICAL TOUCH DEVICE AND TOUCH SENSING METHOD

BACKGROUND OF THE INVENTION

1. Field of the Invention

The invention relates to an optical touch device and a touch sensing method and, more particularly, to an optical touch device having two image sensing units disposed at two corners of an indication plane diagonal to each other, respectively, and a touch sensing method adapted to the optical touch device.

2. Description of the Prior Art

Since consumer electronic products have become more and more lighter, thinner, shorter, and smaller, there is no space on these products for containing a conventional input device, such as mouse, keyboard, etc. With development of touch technology, in various kinds of consumer electronic products (e.g. display device, all-in-one device, mobile phone, personal digital assistant (PDA), etc.), a touch device has become a main tool for data input. Compared with other touch designs, such as a resistive touch design, a capacitive touch design, an ultrasonic touch design, or a projective touch design, an optical touch design has lower cost and is easier to use, especially for large-size touch display.

A conventional optical touch device senses a touch point indicated by a touch object (e.g. finger or stylus) on an indication plane by two image sensing modules arranged separately using a light-shielding manner or a light-reflecting manner. When the image sensing modules sense the touch object, a processing unit of the optical touch device can calculate the touch point indicated by the touch object accordingly.

Referring to FIGS. 1 and 2, FIG. 1 is a schematic diagram illustrating a light-reflecting type optical touch device 1 of the prior art, and FIG. 2 is a light-shielding type optical touch device 1' of the prior art. As shown in FIG. 1, the optical touch device 1 comprises an indication plane 10, two image sensing units 12, a processing unit 14 and two light emitting units 16. The processing unit 14 is electrically connected to the two image sensing units 12. The two image sensing units 12 are disposed at two opposite corners of the same side of the indication plane 10. The two light emitting units 16 are disposed adjacent to the two image sensing units 12, respectively. As shown in FIG. 2, the main difference between the optical touch device 1' and the aforesaid optical touch device 1 is that the optical touch device 1' replaces the light emitting units 16 adjacent to the image sensing units 12 by a plurality of light emitting units 16 (e.g. light emitting frames) disposed around the indication plane 10.

When the optical touch device 1 or the optical touch device 1' is used for sensing one single touch point performed by one single finger, the position of the touch point can be calculated by a triangulation method easily. However, once there are multiple touch points performed by two or more than two fingers, it is complicated for the processing unit 14 to identify and calculate positions of the touch points and this could result in mis-identification and interference. Ghost points are one problem for example. As shown in FIGS. 1 and 2, when two touch objects (e.g. two fingers) touches the indication plane 10 simultaneously, two touch points RP1, RP2 and two ghost points GP1, GP2 will be generated by images captured by the two image sensing units 12. At this time, the processing unit 14 will calculate coordinates of the two touch points RP1, RP2 and coordinates of the two ghost points GP1, GP2 according to the images sensed by the two image sensing units 12. Afterward, the processing unit 14 identifies the two touch points RP1, RP2 as real touch points by some characteristics and conditions and then outputs the coordinates of the two touch points RP1, RP2 after identification. The appearance of ghost points GP1, GP2 will increase complication and difficulty in identifying touch points and algorithm thereof so that the probability of mis-identification will increase in the optical touch device when sensing two or more than two touch points.

SUMMARY OF THE INVENTION

The invention provides an optical touch device having two image sensing units disposed at two corners of an indication plane diagonal to each other, respectively, so as to solve the aforesaid problems.

The invention further provides a touch sensing method adapted to the optical touch device.

According to an embodiment of the invention, an optical touch device comprises an indication plane, two image sensing units and a processing unit. The two image sensing units are disposed at two corners of the indication plane diagonal to each other, respectively, and the two corners define a diagonal line connected therebetween. The processing unit is electrically connected to the two image sensing units. When two touch points are performed on the indication plane, the processing unit determines whether the two touch points are located at opposite sides of the diagonal line, respectively, according to images sensed by the two image sensing units. Once the two touch points are located at opposite sides of the diagonal line, respectively, the processing unit calculates and outputs coordinates of the two touch points immediately according to the images sensed by the two image sensing units.

According to another embodiment of the invention, a touch sensing method is adapted to an optical touch device and the optical touch device comprises an indication plane and two image sensing units, wherein the two image sensing units are disposed at two corners of the indication plane diagonal to each other, respectively, and the two corners define a diagonal line connected therebetween. The touch sensing method comprises steps of when two touch points are performed on the indication plane, the processing unit determining whether the two touch points are located at opposite sides of the diagonal line, respectively, according to images sensed by the two image sensing units; and once the two touch points are located at opposite sides of the diagonal line, respectively, the processing unit calculating and outputting coordinates of the two touch points immediately according to the images sensed by the two image sensing units.

As mentioned in the above, the optical touch device of the invention disposes the two image sensing units at two corners of the indication plane diagonal to each other, respectively. Once two touch points, which are performed on the indication plane, are located at opposite sides of the diagonal line, respectively, there will be no ghost points and the processing unit can calculate and output the coordinates of the two touch points immediately according to the images sensed by the two image sensing units. Accordingly, the probability of generating ghost points will decrease and then the probability of mis-identification for the optical touch device will decrease.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
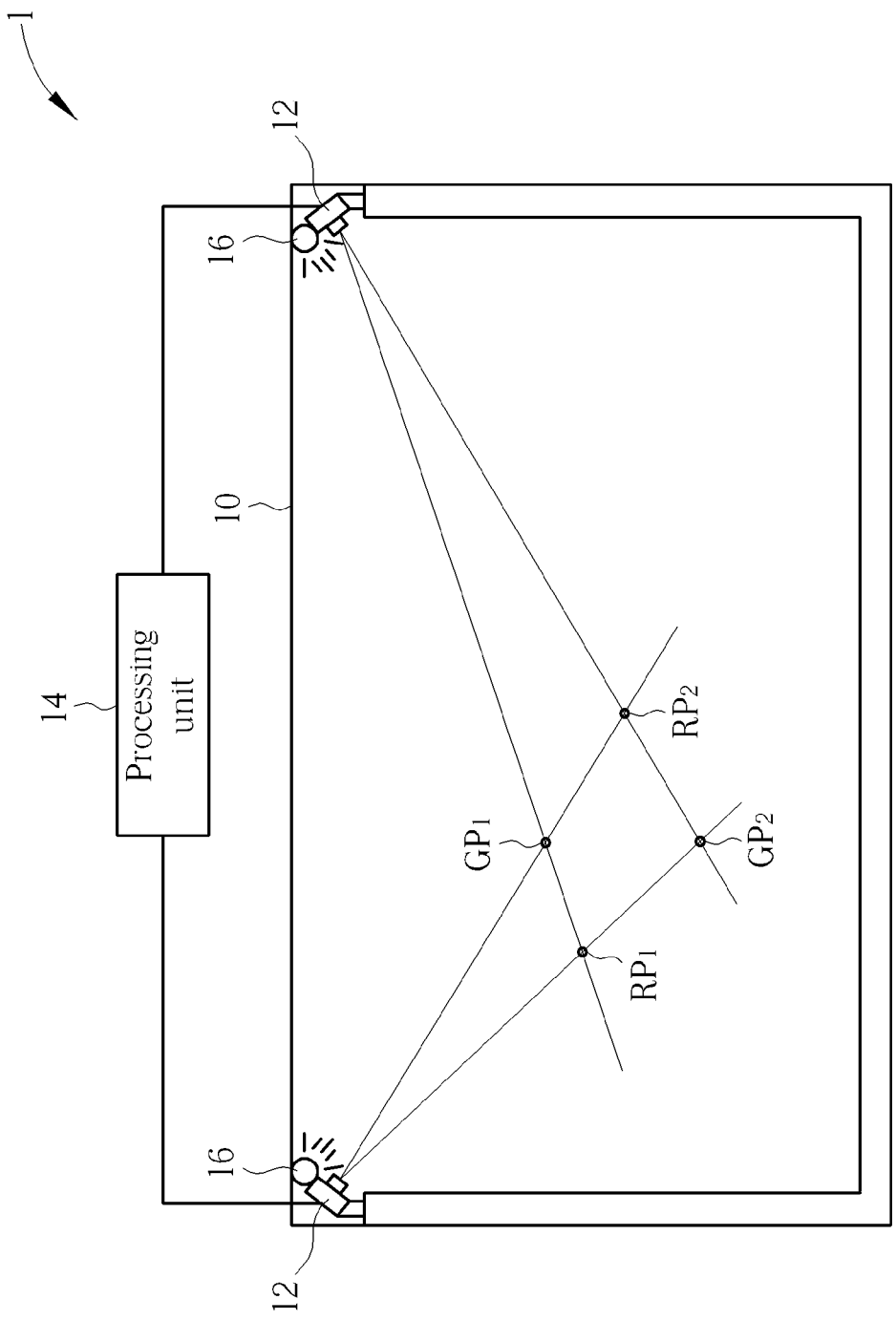
FIG. 1 is a schematic diagram illustrating a light-reflecting type optical touch device of the prior art.
Figure 2:
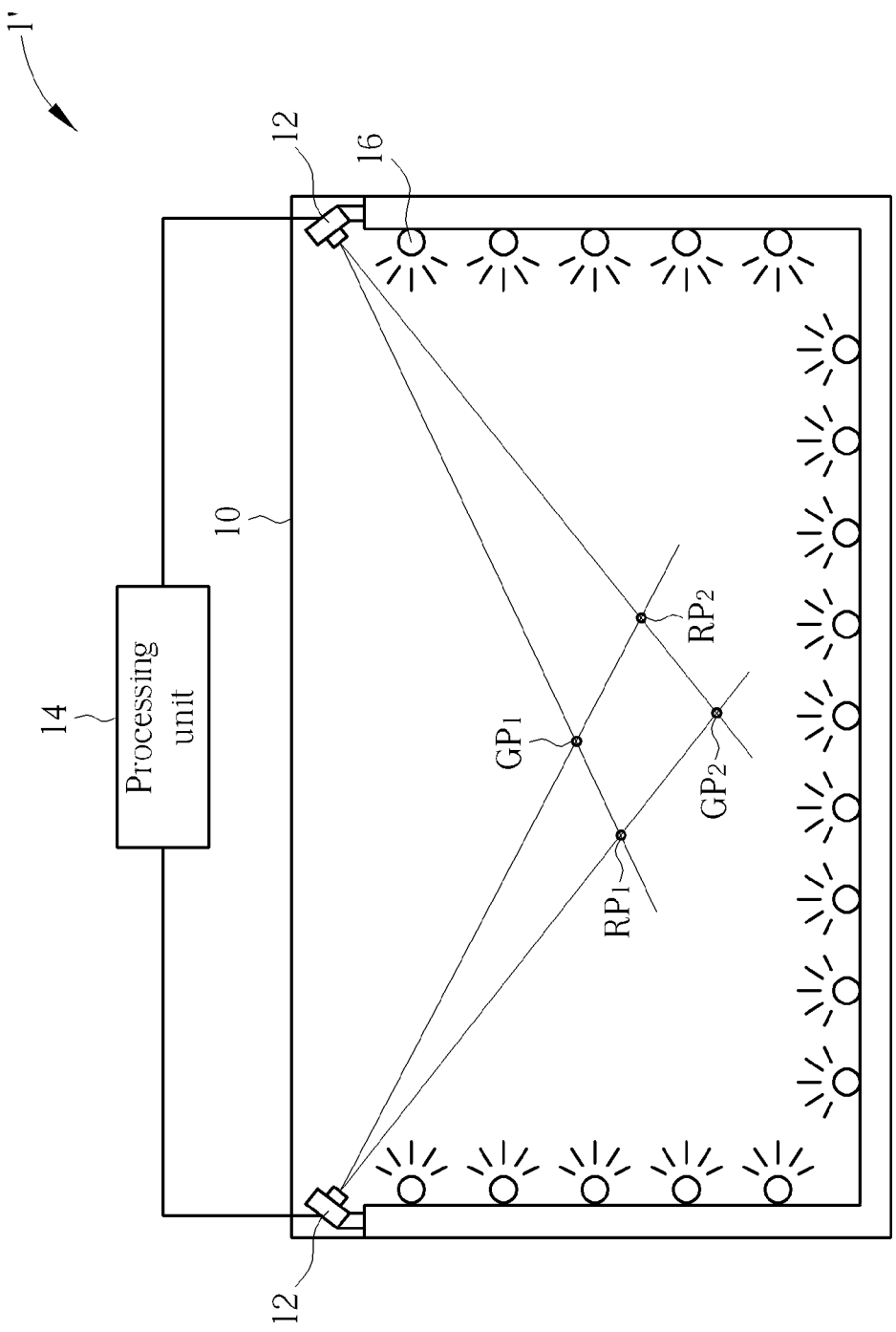
FIG. 2 is a light-shielding type optical touch device of the prior art.
Figure 3:
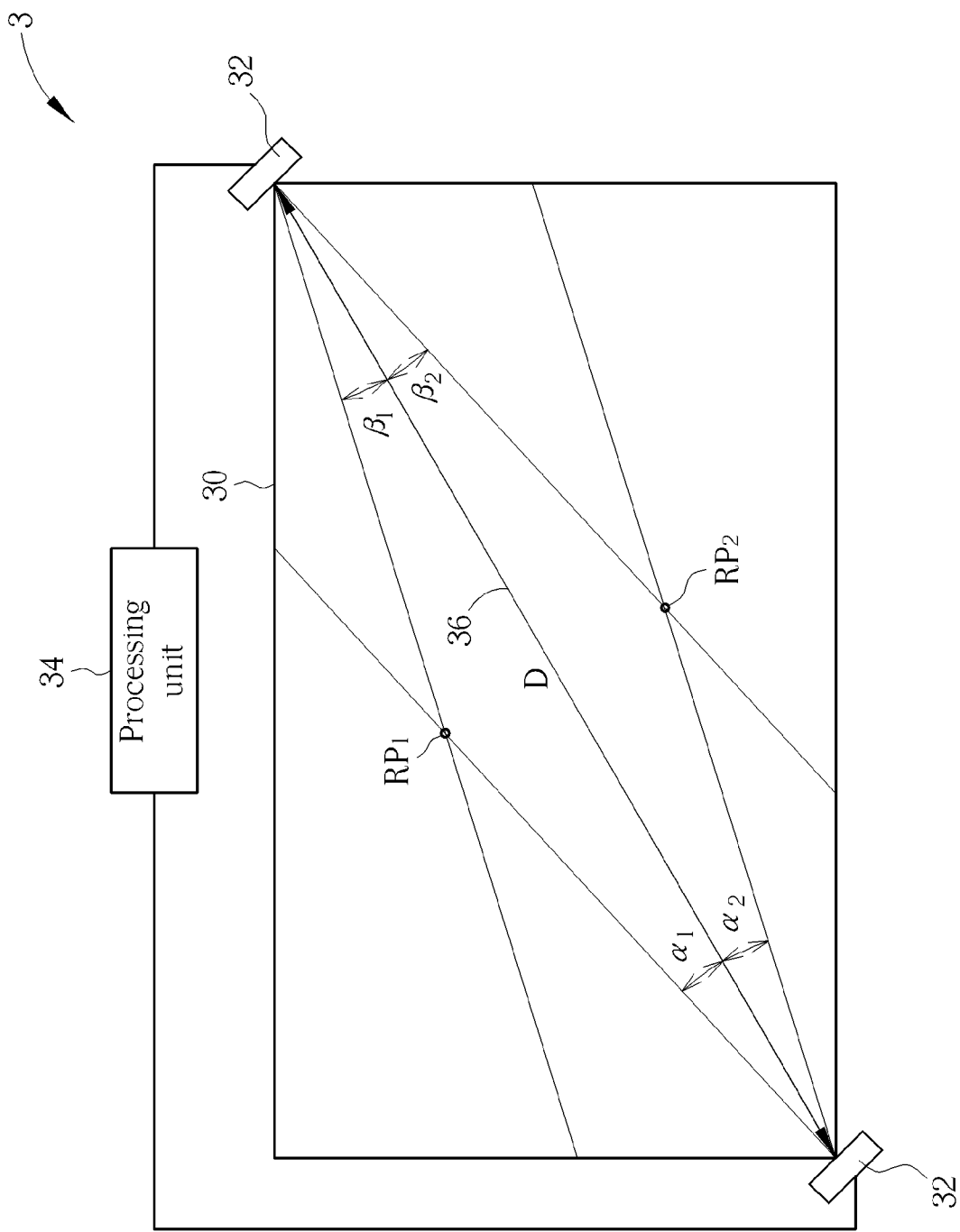
FIG. 3 is a schematic diagram illustrating an optical touch device according to an embodiment of the invention.

Referring to FIG. 3, FIG. 3 is a schematic diagram illustrating an optical touch device 3 according to an embodiment of the invention. As shown in FIG. 3, the optical touch device 3 comprises an indication plane 30, two image sensing units 32 and a processing unit 34. The two image sensing units 32 are disposed at two corners of the indication plane 30 diagonal to each other, respectively, and the two corners define a diagonal line 36 connected therebetween. The processing unit 34 is electrically connected to the two image sensing units 32. In practical applications, the indication plane 30 may be a touch panel for a user to perform touch operation; the image sensing unit 32 may be, but not limited to, a charge-coupled device (CCD) sensor or a complementary metal-oxide semiconductor (CMOS) sensor; and the processing unit 34 may be a processor or a controller with data calculation/processing function. In this embodiment, the light emitting units 16 shown in FIG. 1 may be disposed adjacent to the two image sensing units 32 (e.g. light-shielding type) or the light emitting units 16 shown in FIG. 2 may be disposed around the indication plane 30 (e.g. light-reflecting type) based on practical applications. It should be noted that once the light emitting units 16 shown in FIG. 1 are disposed adjacent to the two image sensing units 32, there may be light reflecting components or light absorbing components disposed around the indication plane 30 based on practical applications. Since the arrangement of the light emitting units and the related components can be achieved by one skilled in the art, it will not be depicted in detail herein.

When two touch objects touch the indication plane 30, the processing unit 34 determines whether two touch points performed by the two touch objects are located at opposite sides of the diagonal line 36, respectively, according to images sensed by the two image sensing units 32. Once the two touch points are located at opposite sides of the diagonal line 36, respectively, the processing unit 34 calculates and outputs coordinates of the two touch points immediately according to the images sensed by the two image sensing units 32. As shown in FIG. 3, two touch points $RP_1$, $RP_2$ are located at opposite sides of the diagonal line 36, respectively and there is no ghost point since the two image sensing units 32 are disposed diagonally. At this time, the processing unit 34 calculates included angles $\alpha_1$, $\beta_1$, $\alpha_2$, $\beta_2$ between the two touch points $RP_1$, $RP_2$ and the diagonal line 36. Then, the processing unit 34 puts the included angles $\alpha_1$, $\beta_1$, $\alpha_2$, $\beta_2$ and a length D of the diagonal line 36 into the following equations 1 to 4 so as to calculate the coordinates $(X_1, Y_1)$, $(X_2, Y_2)$ of the two touch points $RP_1$, $RP_2$.

$$X_1 = \frac{D \times \tan\alpha_1}{\tan\alpha_1 + \tan\beta_1}. \qquad \text{Equation 1}$$

$$Y_1 = X_1 \times \tan\alpha_1. \qquad \text{Equation 2}$$

$$X_2 = \frac{D \times \tan\alpha_2}{\tan\alpha_2 + \tan\beta_2}. \qquad \text{Equation 3}$$

$$Y_2 = X_2 \times \tan\alpha_2. \qquad \text{Equation 4}$$

In other words, since the two image sensing units 32 of the optical touch device 3 are disposed two corners of the indication plane 30 diagonal to each other, respectively, there will be no ghost points once the two touch points $RP_1$, $RP_2$, which are performed on the indication plane 30, are located at opposite sides of the diagonal line 36, respectively. Accordingly, the processing unit 34 can determine the two touch points $RP_1$, $RP_2$ as real touch points and then calculates and outputs the coordinates $(X_1, Y_1)$, $(X_2, Y_2)$ of the two touch points $RP_1$, $RP_2$ immediately according to the images sensed by the two image sensing units 32. Therefore, the probability of generating ghost points will decrease and then the probability of mis-identification for the optical touch device 3 will decrease.

Figure 4A:
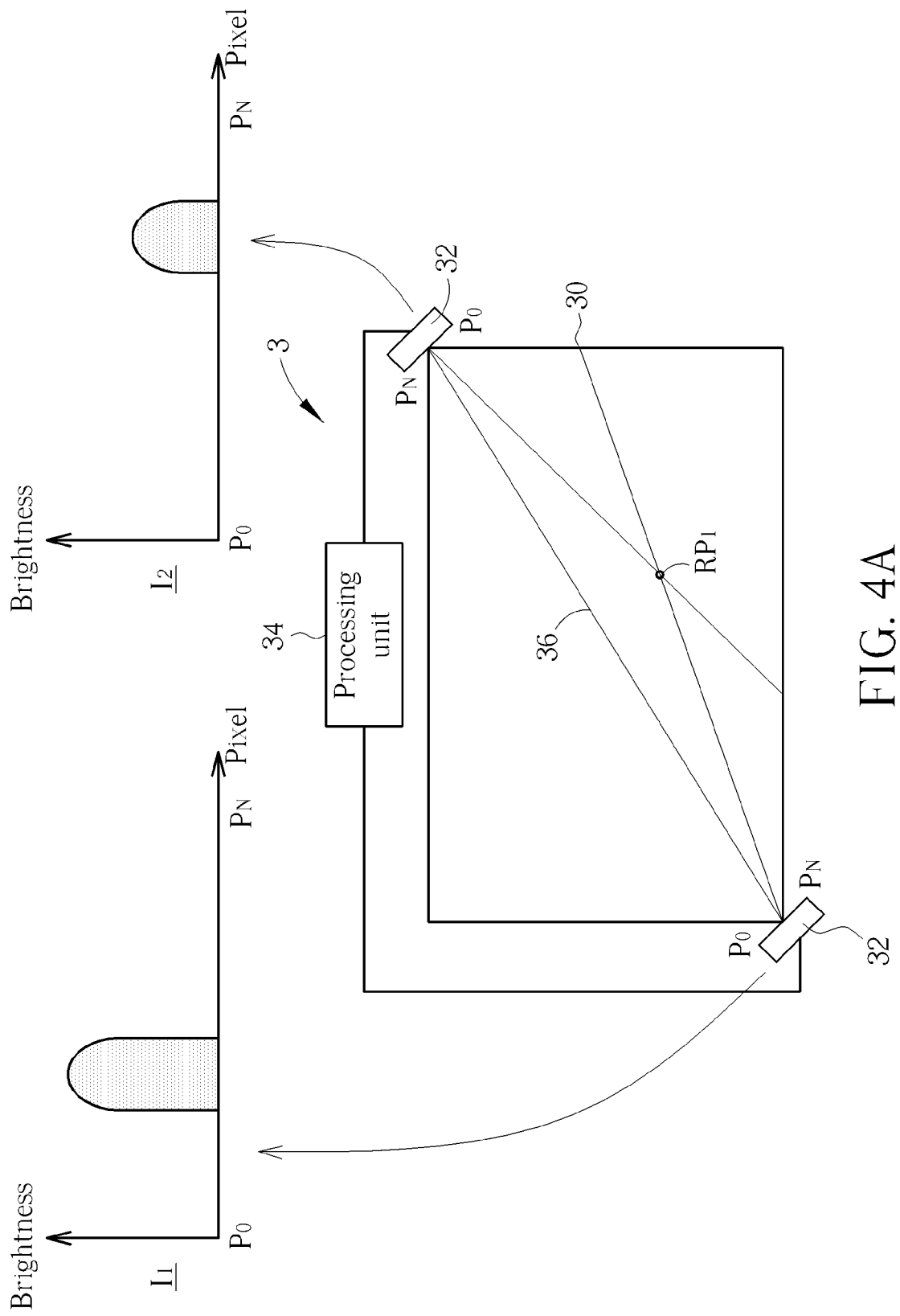
FIG. 4A is a schematic diagram illustrating one touch point performed on the indication plane first and two images sensed by the two image sensing units, respectively.
Figure 4B:
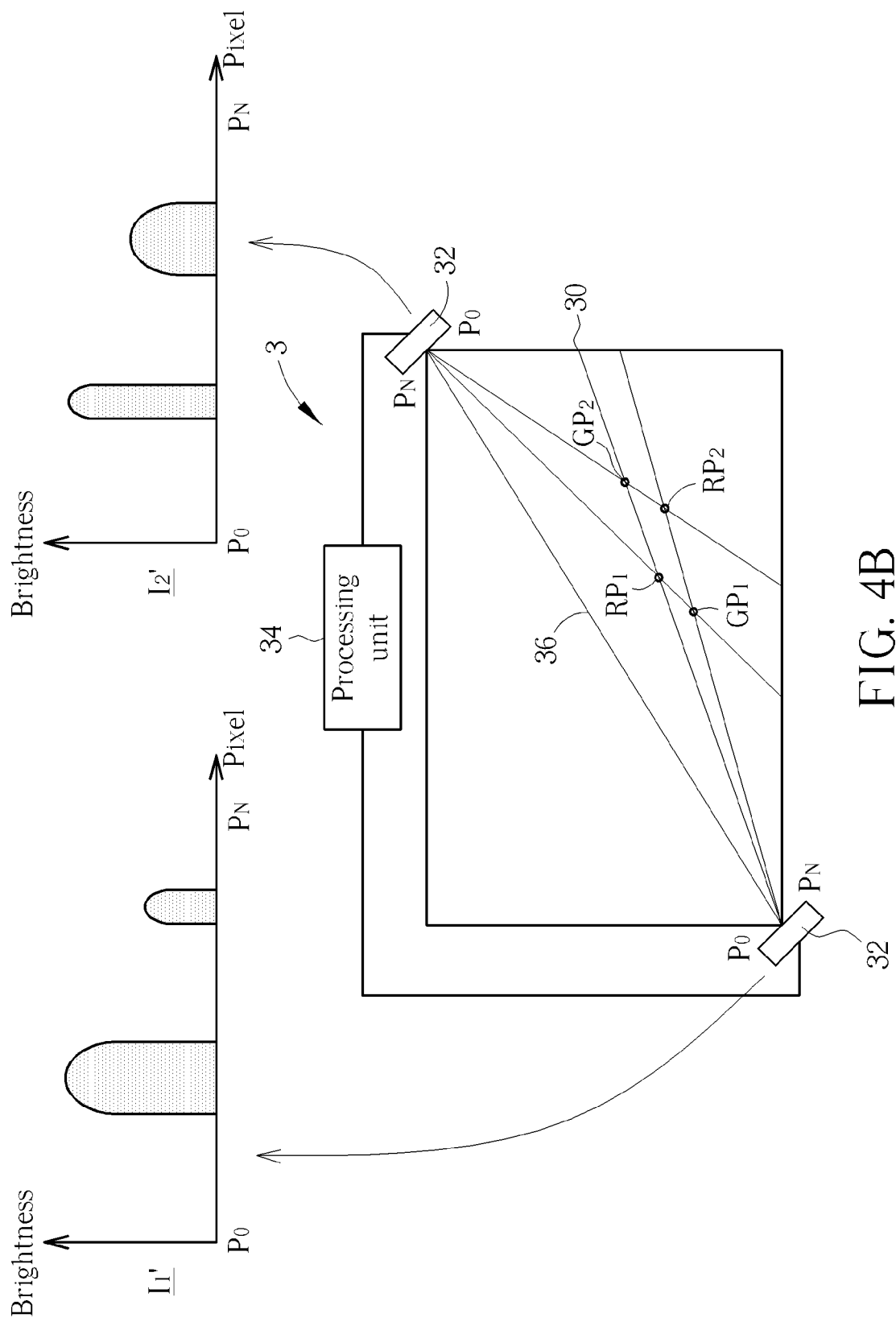
FIG. 4B is a schematic diagram illustrating two touch points performed on the indication plane and two images sensed by the two image sensing units, respectively.

Referring to FIGS. 4A and 4B, FIG. 4A is a schematic diagram illustrating one touch point $RP_1$ performed on the indication plane 30 first and two images $I_1$, $I_2$ sensed by the two image sensing units 32, respectively, and FIG. 4B is a schematic diagram illustrating two touch points $RP_1$, $RP_2$ performed on the indication plane 30 and two images $I_1'$, $I_2'$ sensed by the two image sensing units 32, respectively. As shown in FIG. 4B, the two touch points $RP_1$, $RP_2$ both are located at one side of the diagonal line 36 so two ghost points $GP_1$, $GP_2$ are generated accordingly. As shown in FIG. 4A, once the touch point $RP_1$ is performed on the indication plane 30 first, the two image sensing units 32 sense two images $I_1$, $I_2$, respectively, wherein the image $I_1$ is sensed by the left image sensing unit 32 from pixel $P_0$ to pixel $P_N$ and the image $I_2$ is sensed by the right image sensing unit 32 from pixel $P_0$ to pixel $P_N$. Afterward, when the touch point $RP_2$ is performed on the indication plane 30 after the touch point $RP_1$, the two image sensing units 32 sense two images $I_1'$, $I_2'$, respectively. At this time, the processing unit 34 can identify which two of $RP_1$, $RP_2$, $GP_1$, $GP_2$ are real touch points according to brightness variance of the images $I_1$, $I_2$ and the images $I_1'$, $I_2'$ (i.e. according to appearance sequence of the two touch points $RP_1$, $RP_2$) and then calculates and outputs coordinates of the two touch points $RP_1$, $RP_2$. In other words, once the two touch points $RP_1$, $RP_2$ both are located at one side of the diagonal line 36 and are not performed on the indication plane 30 simultaneously, the processing unit 34 can identify the two touch points $RP_1$, $RP_2$ as real touch points and then calculates and outputs coordinates of the two touch points $RP_1$, $RP_2$ according to appearance sequence of the two touch points $RP_1$, $RP_2$ sensed by the two image sensing units 32. It should be noted that the coordinates of the touch points $RP_1$, $RP_2$ may be calculated by the aforesaid equations 1 to 4 and that will not be depicted in detail herein.

Figure 5:
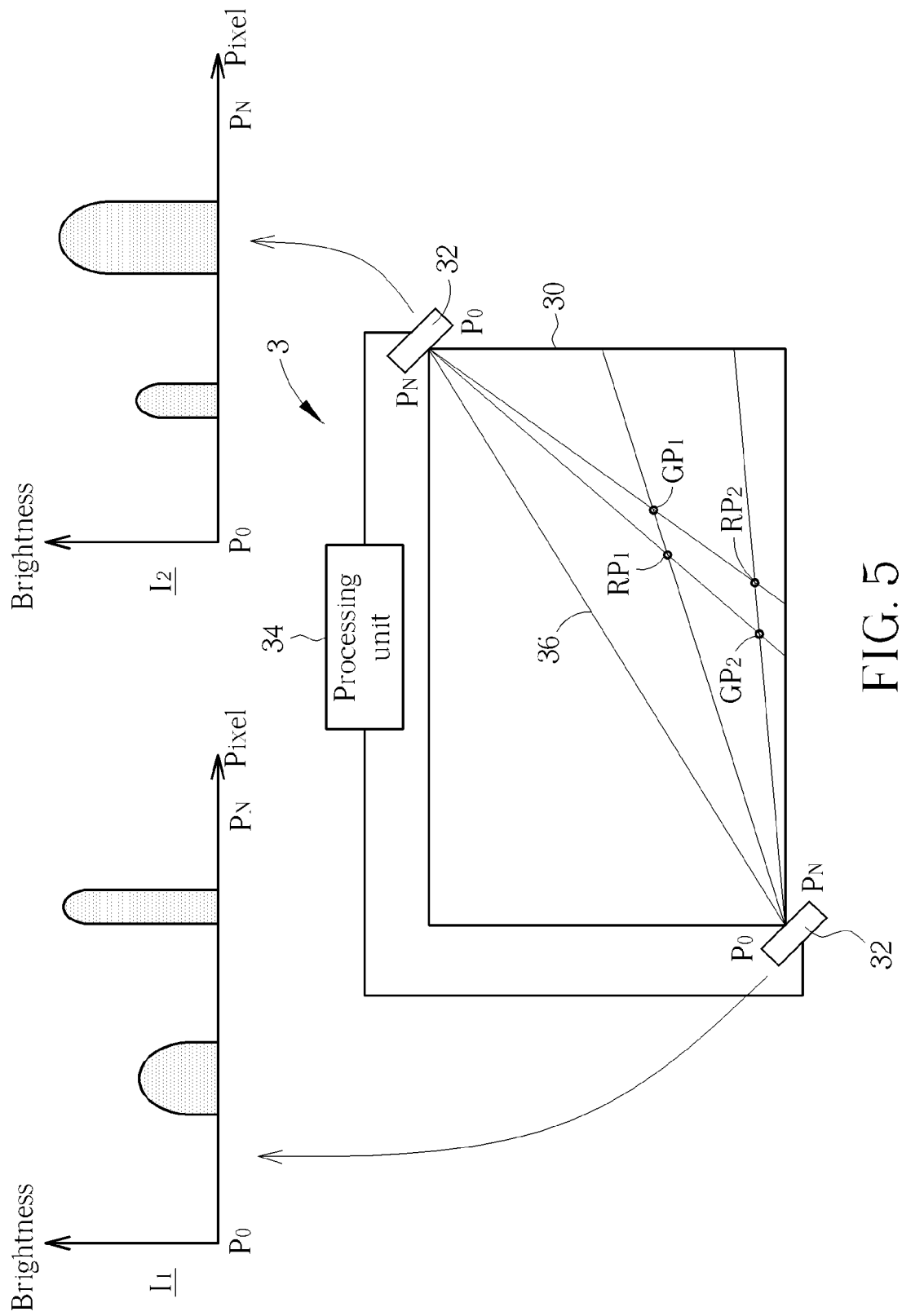
FIG. 5 is a schematic diagram illustrating two touch points performed on the indication plane simultaneously and two images sensed by the two image sensing units, respectively.

Referring to FIG. 5, FIG. 5 is a schematic diagram illustrating two touch points $RP_1$, $RP_2$ performed on the indication plane 30 simultaneously and two images $I_1$, $I_2$ sensed by the two image sensing units 32, respectively. As shown in FIG. 5, the two touch points $RP_1$, $RP_2$ both are located at one side of the diagonal line 36 so two ghost points $GP_1$, $GP_2$ are generated accordingly. Once the two touch points $RP_1$, $RP_2$ are performed on the indication plane 30 simultaneously, the two image sensing units 32 sense two images $I_1$, $I_2$, respectively, wherein the image $I_1$ is sensed by the left image sensing unit 32 from pixel $P_0$ to pixel $P_N$ and the image $I_2$ is sensed by the right image sensing unit 32 from pixel $P_0$ to pixel $P_N$. As shown in the image $I_1$, the brightness of the touch point $RP_1$, which is far away from the left image sensing unit 32, is lower than the brightness of the touch point $RP_2$, which is close to the left image sensing unit 32. As shown in the image $I_2$, the brightness of the touch point $RP_2$, which is far away from the right image sensing unit 32, is lower than the brightness of the touch point $RP_1$, which is close to the right image sensing unit 32. At this time, the processing unit 34 can identify which two of $RP_1$, $RP_2$, $GP_1$, $GP_2$ are real touch points according to brightness of the images $I_1$, $I_2$ and then calculates and outputs coordinates of the two touch points $RP_1$, $RP_2$. In other words, once the two touch points $RP_1$, $RP_2$ both are located at one side of the diagonal line 36 and are performed on the indication plane 30 simultaneously, the processing unit 34 can identify the two touch points $RP_1$, $RP_2$ as real touch points and then calculates and outputs coordinates of the two touch points $RP_1$, $RP_2$ according to brightness of the two touch points $RP_1$, $RP_2$ sensed by the two image sensing units 32. It should be noted that the coordinates of the touch points $RP_1$, $RP_2$ may be calculated by the aforesaid equations 1 to 4 and that will not be depicted in detail herein.

Figure 6:
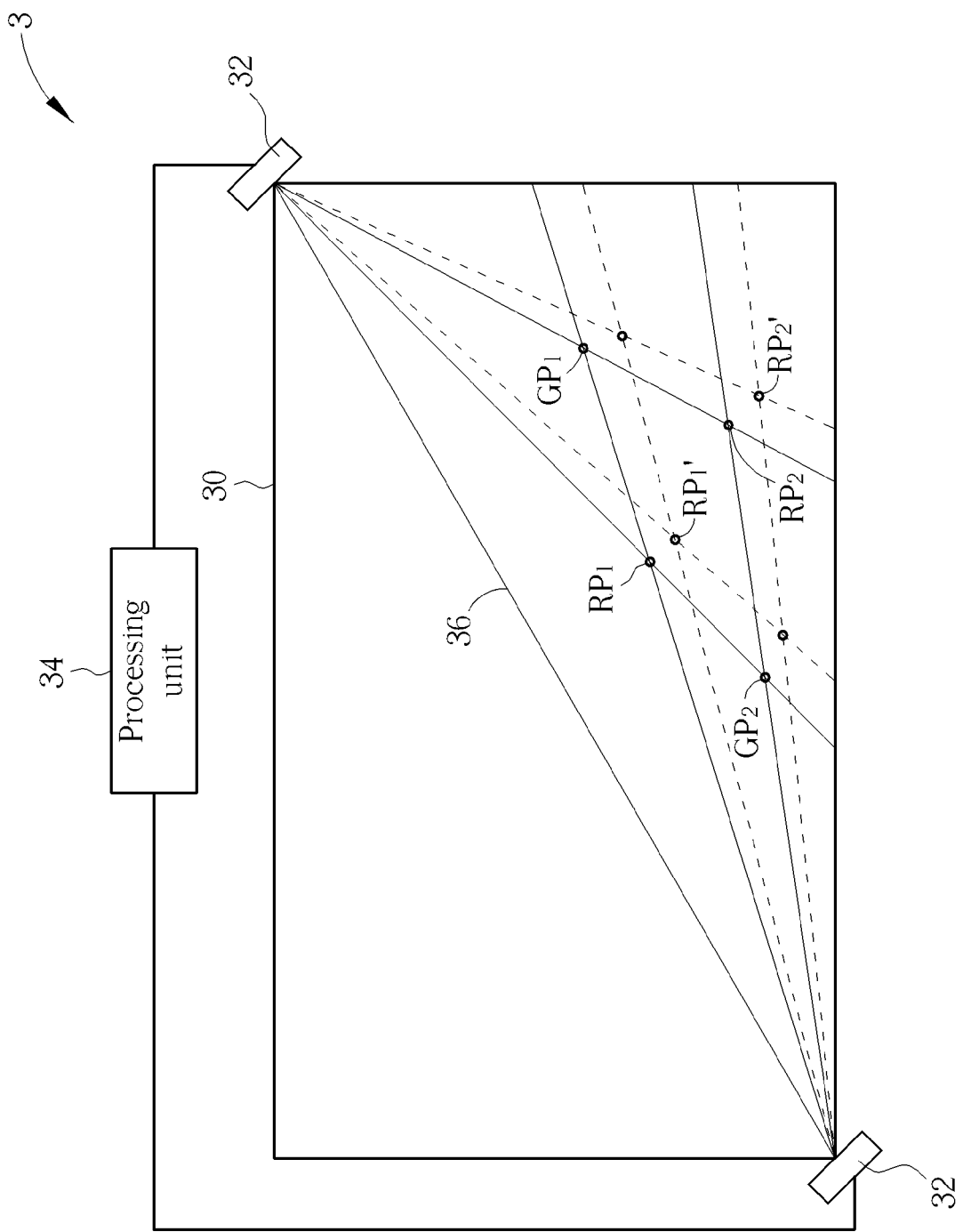
FIG. 6 is a schematic diagram illustrating two touch points performed on the indication plane 30 and being moving.

Referring to FIG. 6, FIG. 6 is a schematic diagram illustrating two touch points $RP_1$, $RP_2$ performed on the indication plane 30 and being moving. As shown in FIG. 6, the two touch points $RP_1$, $RP_2$ both are located at one side of the diagonal line 36 so two ghost points $GP_1$, $GP_2$ are generated accordingly. Once the two touch points $RP_1$, $RP_2$ are moving on the indication plane 30, the positions of the two touch points $RP_1$, $RP_2$ can be found by two touch points $RP_1'$, $RP_2'$, which are prior to the touch points $RP_1$, $RP_2$, since moving trajectories of the touch points $RP_1$, $RP_2$ are known. In other words, once the two touch points $RP_1$, $RP_2$ both are located at one side of the diagonal line 36 and are moving on the indication plane 30, the processing unit 34 can identify which two of $RP_1$, $RP_2$, $GP_1$, $GP_2$ are real touch points and then calculates and outputs coordinates of the two touch points $RP_1$, $RP_2$ according to moving trajectories of the two touch points $RP_1$, $RP_2$. It should be noted that the coordinates of the touch points $RP_1$, $RP_2$ may be calculated by the aforesaid equations 1 to 4 and that will not be depicted in detail herein.

Figure 7:
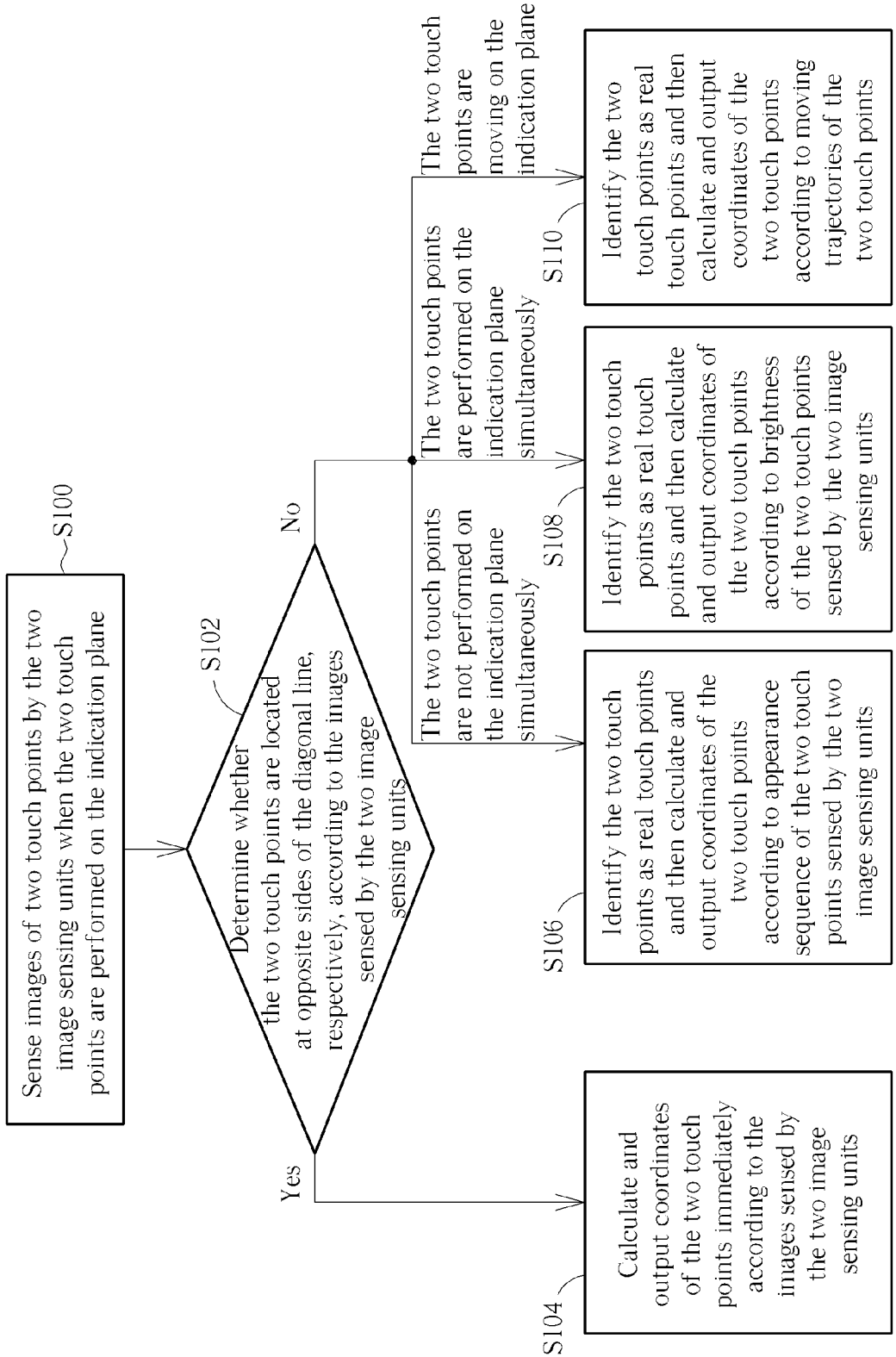
FIG. 7 is a flowchart illustrating a touch sensing method according to an embodiment of the invention.

Referring to FIG. 7, FIG. 7 is a flowchart illustrating a touch sensing method according to an embodiment of the invention. The touch sensing method shown in FIG. 7 is adapted to the aforesaid optical touch device 3. As shown in FIG. 7, first of all, step S100 is performed to sense images of two touch points by the two image sensing units 32 when the two touch points are performed on the indication plane 30. Afterward, step S102 is performed to determine whether the two touch points are located at opposite sides of the diagonal line 36, respectively, according to the images sensed by the two image sensing units 32. Once the two touch points are located at opposite sides of the diagonal line 36, respectively (as shown in FIG. 3), step S104 is performed to calculate and output coordinates of the two touch points immediately according to the images sensed by the two image sensing units 32. Once the two touch points both are located at one side of the diagonal line 36 and are not performed on the indication plane 30 simultaneously (as shown in FIGS. 4A and 4B), step S106 is performed to identify the two touch points as real touch points and then calculate and output coordinates of the two touch points according to appearance sequence of the two touch points sensed by the two image sensing units 32. Once the two touch points both are located at one side of the diagonal line 36 and are performed on the indication plane 30 simultaneously (as shown in FIG. 5), step S108 is performed to identify the two touch points as real touch points and then calculate and output coordinates of the two touch points according to brightness of the two touch points sensed by the two image sensing units 32. Once the two touch points both are located at one side of the diagonal line 36 and are moving on the indication plane 30 (as shown in FIG. 6), step S110 is performed to identify the two touch points as real touch points and then calculate and output coordinates of the two touch points according to moving trajectories of the two touch points. It should be noted that each part or function of the control logics of the touch sensing method shown in FIG. 7 may be implemented by software, hardware or the combination thereof.

As mentioned in the above, the optical touch device of the invention disposes the two image sensing units at two corners of the indication plane diagonal to each other, respectively. Once two touch points, which are performed on the indication plane, are located at opposite sides of the diagonal line, respectively, there will be no ghost points and the processing unit can calculate and output the coordinates of the two touch points immediately according to the images sensed by the two image sensing units. Accordingly, the probability of generating ghost points will decrease and then the probability of mis-identification for the optical touch device will decrease. Furthermore, once the two touch points, which are performed on the indication plane, both are located at one side of the diagonal line, the processing unit may identify the two touch points as real touch points and then calculates and outputs the coordinates of the two touch points according to the appearance sequence of the two touch points sensed by the two image sensing units, the brightness of the two touch points sensed by the two image sensing units, or the moving trajectories of the two touch points selectively. It should be noted that the features of the invention not only can be applied to a touch device for identifying two touch points but also can be applied to a touch device for identifying more than two touch points by one skilled in the art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch device comprising:
   an indication plane having four corners;
   only two image sensing units disposed at two of the four corners of the indication plane diagonal to each other, respectively, the two of the four corners defining a diagonal line connected therebetween; and
   a processing unit electrically connected to the two image sensing units;
   wherein when two touch points are performed on the indication plane, the processing unit determines whether the two touch points are located at opposite sides of the diagonal line, respectively, according to images sensed by the two image sensing units;
   once the two touch points are located at opposite sides of the diagonal line, respectively, the processing unit determines that there is no ghost point immediately without performing any additional processes of identifying ghost point and then calculates and outputs coordinates of the two touch points immediately after determining that the two touch points are located at opposite sides of the diagonal line;
   once the two touch points both are located at one side of the diagonal line and are performed on the indication plane simultaneously, the processing unit identifies the two touch points as real touch points and then calculates and outputs coordinates of the two touch points according to brightness of the two touch points sensed by the two image sensing units;

once the two touch points both located at one side of the diagonal line and are not performed on the indication plane simultaneously, the processing unit identifies the two touch points as real touch points and then calculates and outputs coordinates of the two touch points according to appearance sequence of the two touch points sensed by the two image sensing units;

once the two touch points both are located at one side of the diagonal line and are both moving on the indication plane, the processing unit identifies the two touch points as real touch points and then calculates and outputs coordinates of the two touch points according to the moving trajectories of the two touch points.

2. A touch sensing method adapted to an optical touch device, the optical touch device comprising an indication plane and only two image sensing units, the indication plane having four corners, the two image sensing units being disposed at two of the four corners of the indication plane diagonal to each other, respectively, the two of the four corners defining a diagonal line connected therebetween, the touch sensing method comprising:

when two touch points are performed on the indication plane, determining whether the two touch points are located at opposite sides of the diagonal line, respectively, according to images sensed by the two image sensing units;

once the two touch points are located at opposite sides of the diagonal line, respectively, determining that there is no ghost point immediately without performing any additional process of identifying ghost point and then calculating and outputting coordinates of the two touch points immediately after determining that the two touch points are located at opposite sides of the diagonal line;

once the two touch points both are located at one side of the diagonal line and are performed on the indication plane simultaneously, identifying the two touch points as real touch points and then calculating and outputting coordinates of the two touch points according to brightness of the two touch points sensed by the two image sensing units;

once the two touch points both are located at one side of the diagonal line and are not performed on the indication plane simultaneously, identifying the two touch points as real touch points and then calculating and outputting coordinates of the two touch points according to appearance sequence of the two touch points sensed by the two image sensing units;

once the two touch points both are located at one side of the diagonal line and are moving on the indication plane, identifying the two touch points as real touch points and then calculating and outputting coordinates of the two touch points according to the moving trajectories of the two touch points.

* * * * *